US011835179B2

(12) United States Patent
Laguduwa et al.

(10) Patent No.: US 11,835,179 B2
(45) Date of Patent: Dec. 5, 2023

(54) SYSTEMS AND METHODS FOR MONITORING EVACUATION ASSEMBLY CHARGE CYLINDERS (71) Applicant: Goodrich Corporation, Charlotte, NC (US)

(72) Inventors: Sivakumar Laguduwa, Thubarahalli (IN); Jeffrey Martin Werbelow, Phoenix, AZ (US); Arun Prasad, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 769 days.

(21) Appl. No.: 16/983,192

(22) Filed: Aug. 3, 2020

(65) Prior Publication Data
US 2021/0325000 A1 Oct. 21, 2021

(30) Foreign Application Priority Data
Apr. 16, 2020 (IN) .............................. 202041016489

(51) Int. Cl.
*F17C 13/02* (2006.01)
*B64D 45/00* (2006.01)
*B64D 25/14* (2006.01)

(52) U.S. Cl.
CPC ............ *F17C 13/025* (2013.01); *B64D 25/14* (2013.01); *B64D 45/00* (2013.01); *F17C 2250/036* (2013.01); *F17C 2250/0434* (2013.01); *F17C 2270/0189* (2013.01)

(58) Field of Classification Search
CPC .............. F17C 13/025; F17C 2250/036; F17C 2250/0434; F17C 2270/0189; B64D 25/14; B64D 45/00
See application file for complete search history.

(56) References Cited

U.S. PATENT DOCUMENTS

| 5,738,303 | A  | * | 4/1998  | Hamatani  | B64D 25/14 |
|           |    |   |         |           | 244/905    |
| 6,443,259 | B1 | * | 9/2002  | Oney      | B64D 25/14 |
|           |    |   |         |           | 182/48     |
| 6,860,205 | B2 | * | 3/2005  | Baker     | B64D 25/14 |
|           |    |   |         |           | 244/129.1  |
| 7,360,788 | B2 | * | 4/2008  | Yano      | B60R 21/272 |
|           |    |   |         |           | 280/741    |
| 9,150,462 | B2 | * | 10/2015 | Deshpande | B64D 25/14 |
| 2004/0000617 | A1 | * | 1/2004 | Baker | B64D 25/14 |
|           |    |   |         |           | 244/129.1  |

(Continued)

*Primary Examiner* — Hai Phan
*Assistant Examiner* — Son M Tang
(74) *Attorney, Agent, or Firm* — SNELL & WILMER L.L.P.

(57) ABSTRACT

A system for monitoring compressed fluid sources of an evacuation assembly may comprise a controller and a tangible, non-transitory memory configured to communicate with the controller. The controller may perform operations, which may comprise receiving a series of first pressure measurements from a first sensor system, receiving a series of second pressure measurements from a second sensor system, calculating a first pressure trend using the series of first pressure measurements, calculating a second pressure trend using the series of second pressure measurements, and comparing each of the first pressure trend and the second pressure trend to a threshold pressure trend.

14 Claims, 5 Drawing Sheets

(56) References Cited

U.S. PATENT DOCUMENTS

| | | | |
|---|---|---|---|
| 2007/0045473 A1* | 3/2007 | Clegg | B64D 25/14 244/905 |
| 2007/0275615 A1* | 11/2007 | Norton | F04B 49/022 441/90 |
| 2015/0097083 A1* | 4/2015 | Fellmann | B64D 9/00 244/137.2 |
| 2015/0145702 A1* | 5/2015 | Waigl | B64C 1/1423 340/945 |
| 2016/0236796 A1* | 8/2016 | Piroozmandi | B64C 25/60 |
| 2016/0257421 A1* | 9/2016 | Ye | G07C 5/0858 |
| 2017/0203849 A1* | 7/2017 | John | B64D 25/14 |
| 2017/0327237 A1* | 11/2017 | Saini | B64D 25/14 |
| 2017/0334573 A1* | 11/2017 | Waigl | G01L 13/00 |
| 2019/0257710 A1* | 8/2019 | Fages | F17C 1/00 |
| 2021/0122499 A1* | 4/2021 | Luobikis | B64D 45/00 |

* cited by examiner

SYSTEMS AND METHODS FOR MONITORING EVACUATION ASSEMBLY CHARGE CYLINDERS

CROSS REFERENCE TO RELATED APPLICATIONS

This application claims priority to and the benefit of India Patent Application No. 202041016489 filed on Apr. 16, 2020 and entitled "SYSTEMS AND METHODS FOR MONITORING EVACUATION ASSEMBLY CHARGE CYLINDERS," which is hereby incorporated by reference in its entirety for all purposes.

FIELD

The present disclosure relates to aircraft evacuation assemblies and, in particular, to systems and methods for monitoring evacuation assembly charge cylinders.

BACKGROUND

An emergency evacuation assembly may be used to exit an aircraft absent a jet way or other suitable means of egress for passengers. The evacuation assembly may include an inflatable slide and one or more compressed fluid source(s) configured to inflate the slide. Current compressed fluid sources may include a pressure gauge configured to measure a pressure within compressed fluid source. Current pressure gauges are configured for manual assessment, wherein, for example, maintenance personnel determine the pressure by reading or viewing an output of the pressure gauge. For example, maintenance personnel may determine the pressure by viewing an indicator configured to point to a pressure measurement from a listing of possible pressure measurements.

SUMMARY

A system for monitoring compressed fluid sources of an evacuation assembly is disclosed herein. In accordance with various embodiments, the system may comprise a controller and a tangible, non-transitory memory configured to communicate with the controller. The tangible, non-transitory memory may have instructions stored thereon that, in response to execution by the controller, cause the controller to perform operations, which may comprise: receiving, by the controller, a series of first pressure measurements from a first sensor system; and receiving, by the controller, a series of second pressure measurements from a second sensor system. The first sensor system may be configured to measure a pressure within a first compressed fluid source, and the second sensor system may be configured to measure a pressure within a second compressed fluid source. The operations may further comprise: calculating, by the controller, a first pressure trend for the first compressed fluid source using the series of first pressure measurements; calculating, by the controller, a second pressure trend for the second compressed fluid source using the series of second pressure measurements; and comparing, by the controller, each of the first pressure trend and the second pressure trend to a threshold pressure trend.

In various embodiments, the operations may further comprise determining, by the controller, whether to send an alert command based on the comparing, by the controller, each of the first pressure trend and the second pressure trend to the threshold pressure trend.

In various embodiments, the operations may further comprise: identifying, by the controller, a greatest pressure trend value; determining, by the controller, a pressure trend average; comparing, by the controller, the greatest pressure trend value to the pressure trend average; and determining, by the controller, whether to send an alert command based on a difference between the greatest pressure trend value and the pressure trend average.

In various embodiments, determining, by the controller, the pressure trend average may comprise deriving, by the controller, a moving pressure trend average. In various embodiments, the operations may further comprise sending, by the controller, the alert command to a crew notification system.

In various embodiments, comparing, by the controller, each of the first pressure trend and the second pressure trend to the threshold pressure trend may comprise: comparing, by the controller, each of the first pressure trend and the second pressure trend to a first threshold trend; and comparing, by the controller, each of the first pressure trend and the second pressure trend to a second threshold trend. The second threshold trend may be different from the first threshold trend.

In various embodiments, the operations may further comprise determining, by the controller, whether to send at least one of a first alert command or a second alert command. The controller may be configured to send the first alert command if at least one of the first pressure trend or the second pressure trend is greater than or equal to the first threshold trend and less than or equal to the second threshold trend. The controller may be configured to send the second alert command if at least one of the first pressure trend or the second pressure trend is greater than the second threshold trend.

In various embodiments, a wireless router may be configured to receive the series of first pressure measurements and the series of second pressure measurements. The wireless router may be electrically coupled to the controller, and the series of first pressure measurements and the series of second pressure measurements may be sent to the controller via the wireless router.

A method for monitoring compressed fluid sources of an evacuation assembly is also disclosed herein. In accordance with various embodiments, the method may comprise the steps of receiving, by a controller, a series of first pressure measurements from a first sensor system configured to measure a pressure within a first compressed fluid source; calculating, by the controller, a first pressure trend for the first compressed fluid source using the series of first pressure measurements; and comparing, by the controller, the first pressure trend to a threshold pressure trend.

In various embodiments, the method may further comprise the steps of receiving, by the controller, a series of second pressure measurements from a second sensor system configured to measure a pressure within a second compressed fluid source; calculating, by the controller, a second pressure trend for the second compressed fluid source using the series of second pressure measurements; and comparing, by the controller, the second pressure trend to the threshold pressure trend.

In various embodiments, the method may further comprise the steps of identifying, by the controller, a greatest pressure trend value; determining, by the controller, a pressure trend average; comparing, by the controller, the greatest pressure trend value to the pressure trend average; and determining, by the controller, whether to send an alert command based on a difference between the greatest pressure trend value and the pressure trend average.

In various embodiments, determining, by the controller, the pressure trend average may comprise deriving, by the controller, a moving pressure trend average. In various embodiments, the method may further comprise the step of sending, by the controller, the alert command to a crew notification system.

In various embodiments, comparing, by the controller, the first pressure trend to the threshold pressure trend may comprise comparing, by the controller, the first pressure trend to a first threshold trend; and comparing, by the controller, the first pressure trend to a second threshold trend. The second threshold trend may be different from the first threshold trend.

In various embodiments, the method may further comprise the step of determining, by the controller, whether to send at least one of a first alert command or a second alert command. The controller may be configured to send the first alert command if the first pressure trend is greater than or equal to the first threshold trend and less than or equal to the second threshold trend. The controller may be configured to send the second alert command if the first pressure trend is greater than the second threshold trend.

An evacuation assembly is also disclosed herein. In accordance with various embodiments, the evacuation assembly may comprise a first compressed fluid source, a second compressed fluid source, a first sensor system configured to measure a pressure within the first compressed fluid source, and a second sensor system configured to measure a pressure within the second compressed fluid source. A controller may be operably coupled to the first sensor system and the second sensor system, and a tangible, non-transitory memory may be configured to communicate with the controller. The tangible, non-transitory memory may have instructions stored thereon that, in response to execution by the controller, cause the controller to perform operations, which may comprise: receiving, by the controller, a series of first pressure measurements output by the first sensor system; receiving, by the controller, a series of second pressure measurements output by the second sensor system; calculating, by the controller, a first pressure trend using the series of first pressure measurements; calculating, by the controller, a second pressure trend using the series of first pressure measurements; and comparing, by the controller, each of the first pressure trend and the second pressure trend to a threshold pressure trend.

In various embodiments, the operations may further comprise: identifying, by the controller, a greatest pressure trend value; determining, by the controller, a pressure trend average; comparing, by the controller, the greatest pressure trend value to the pressure trend average; and determining, by the controller, whether to send an alert command based on a difference between the greatest pressure trend value and the pressure trend average.

In various embodiments, a crew notification system may be in communication with the controller, and the operations may further comprise sending, by the controller, the alert command to the crew notification system.

In various embodiments, the first sensor system may be configured to send the series of first pressure measurements wirelessly, and the second sensor system may be configured to send the series of second pressure measurements wirelessly.

In various embodiments, a wireless router may be configured to receive the series of first pressure measurements from the first sensor system and the series of second pressure measurements from the second sensor system. The wireless router may be electrically coupled to the controller. The series of first pressure measurements and the series of second pressure measurements may be sent to the controller via the wireless router.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

The systems and methods disclosed herein may find particular use in connection with aircraft evacuation assemblies. However, various aspects of the disclosed systems and methods may be adapted for performance in a variety of other inflatable assemblies, for example, inflatable raft assemblies, and/or any other assemblies having charged cylinders. As such, numerous applications of the present disclosure may be realized.

Figure 1:
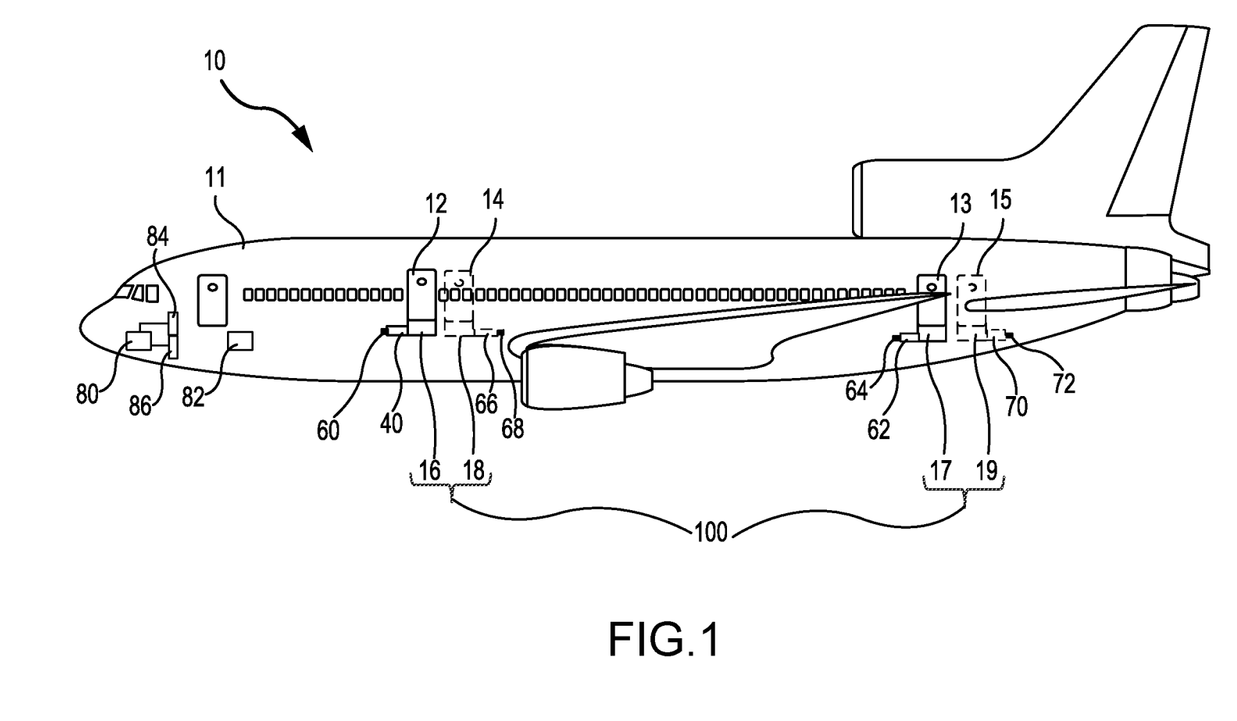
FIG. 1 illustrates an aircraft having an evacuation assembly, in accordance with various embodiments.

Referring now to FIG. 1, an aircraft 10 is shown. Aircraft 10 may include a fuselage 11 having plurality of exit doors, including exit door 12 and exit door 13 located along a first side of fuselage 11, and exit door 14 and exit door 15 located along a second, opposing side of fuselage 11. Aircraft 10 may include an evacuation assembly 100. Evacuation assembly 100 may include one or more evacuation systems positioned near a corresponding exit door. For example, evacuation assembly 100 includes an evacuation system 16 positioned near exit door 12, an evacuation system 17 positioned near exit door 13, an evacuation system 18 positioned near exit door 14, and an evacuation system 19 positioned near exit door 15. In the event of an emergency, exit doors 12, 13, 14, 15 may each be opened by a passenger or crew member of aircraft 10. Evacuation systems 16, 17, 18, 19 may deploy in response to exit doors 12, 13, 14, 15, respectively, being opened or in response to another action taken by a passenger or crew member such as depression of a button, actuation of a lever, or the like.

Figure 2:
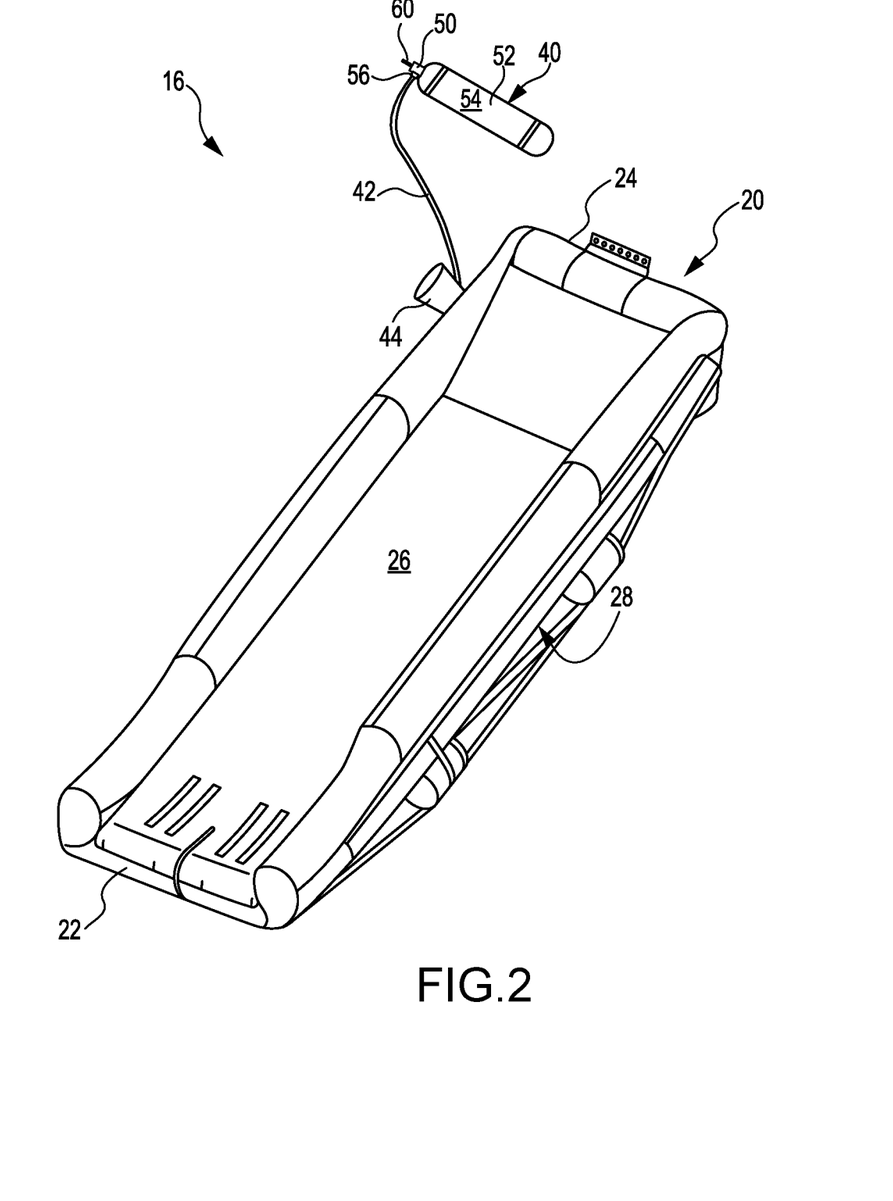
FIG. 2 illustrates a perspective view of an evacuation slide in a deployed position, in accordance with various embodiments.

With momentary reference to FIG. 2, additional details of evacuation system 16 are illustrated. In accordance with various embodiments, evacuation system 16 may include an evacuation slide 20. In FIG. 2, evacuation slide 20 is illustrated in an inflated or "deployed" position. While FIG. 2 illustrates features of evacuation system 16, it is contemplated and understood that evacuation system 17, evacuation system 18, and evacuation system 19 of evacuation assembly 100 may each include the features and functionalities as described herein with reference to evacuation system 16.

In accordance with various embodiments, evacuation slide 20 includes a toe end 22 and a head end 24 opposite toe end 22. Head end 24 may be coupled to an aircraft structure (e.g., fuselage 11 in FIG. 1). In accordance with various embodiments, evacuation slide 20 is an inflatable slide. Evacuation slide 20 includes a sliding surface 26 and an underside surface 28 opposite sliding surface 26. Sliding surface 26 extends from head end 24 to toe end 22. During an evacuation event, underside surface 28 may be oriented toward an exit surface (e.g., toward the ground or toward a body of water). Evacuation slide 20 is illustrated as a single lane slide; however, evacuation slide 20 may comprise any number of lanes.

Evacuation system 16 includes a compressed fluid source 40 (also referred to as a charge cylinder). Compressed fluid source 40 is configured to deliver a pressurized gas to inflate evacuation slide 20. Compressed fluid source 40 is fluidly coupled to evacuation slide 20. For example, compressed fluid source 40 may be fluidly coupled to evacuation slide 20 via a hose, or conduit, 42. In response to receiving gas from compressed fluid source 40, evacuation slide 20 begins to inflate. In various embodiments, an aspirator 44 may be fluidly coupled between compressed fluid source 40 and evacuation slide 20. Aspirator 44 is configured to entrain ambient air with gas output from compressed fluid source 40 (referred to herein as primary gas). For example, in response to deployment of evacuation slide 20, primary gas from compressed fluid source 40 may flow into aspirator 44. The primary gas flow may cause aspirator 44 to draw in a secondary gas (i.e., ambient air) from the environment. The primary gas flow and the secondary gas may be directed into evacuation slide 20. In response to receiving the primary gas and the environmental gas, evacuation slide 20 begins to inflate. In various embodiments, aspirator 44 may be eliminated and conduit 42 may be directly connected to evacuation slide 20.

In accordance with various embodiments, conduit 42 may be connected to a neck 50 of compressed fluid source 40. Neck 50 may be a pipe, or other conduit, that extends from the cylindrically-shaped housing 52 of compressed fluid source 40. Neck 50 is fluidly connected to an internal volume 54 of compressed fluid source 40 that is defined by housing 52. In various embodiments, compressed fluid source 40 may include a valve 56 configured to regulate the flow of fluid from compressed fluid source 40. When evacuation slide 20 is in a stowed (or deflated) state, valve 56 may be in a closed position. In response to deployment of evacuation system 16, valve 56 may be forced (e.g., translated) to an open position, thereby allowing fluid to flow from compressed fluid source 40 to evacuation slide 20.

In accordance with various embodiments, compressed fluid source 40 includes a sensor system 60. As described in further detail below, sensor system 60 is operationally coupled to compressed fluid source 40 and is configured to measure a pressure within compressed fluid source 40. Sensor system 60 is configured to wirelessly output pressure data (i.e., pressure measurements) corresponding to the pressure within compressed fluid source 40. In various embodiments, sensor system 60 may be coupled to neck 50, such that sensor system 60 measures the pressure of compressed fluid source 40 at neck 50. While sensor system 60 is illustrated and described as coupled to neck 50, it is contemplated and understood that sensor system 60 may be mounted at any location on compressed fluid source 40 where sensor system 60 can measure the pressure within compressed fluid source 40 and output the pressure measurements wirelessly. In various embodiments, sensor system 60 may also include a temperature sensor configured to measure the temperature at or within compressed fluid source 40. Sensor system 60 is configured to wirelessly output temperature data (i.e., temperature measurements) corresponding the temperature at or within compressed fluid source 40.

Returning to FIG. 1, evacuation system 17 may include a compressed fluid source 62 and a sensor system 64 operationally coupled to compressed fluid source 62. Sensor system 64 is configured to measure a pressure within compressed fluid source 62 and a temperature at or within compressed fluid source 62. Evacuation system 18 may include a compressed fluid source 66 and a sensor system 68 operationally coupled to compressed fluid source 66. Sensor system 68 is configured to measure a pressure within compressed fluid source 66 and a temperature at or within compressed fluid source 66. Evacuation system 19 may include a compressed fluid source 70 and a sensor system 72 operationally coupled to compressed fluid source 70. Sensor system 72 is configured to measure a pressure within compressed fluid source 70 and a temperature at or within compressed fluid source 70.

Evacuation assembly 100 may comprise a controller 80 and a crew notification system 82. The pressure and temperature measurements from sensor systems 60, 64, 68, 72 may be output wirelessly to one or more wireless routers, such as wireless router 84 and wireless router 86. Wireless routers 84, 86 may be electrically coupled (e.g., via wired connection) to controller 80. Controller 80 may operate to receive information from sensor systems 60, 64, 68, 72, via wireless routers 84, 86, and determine a health or a prognostic of compressed fluid sources 40, 62, 66, 70 based on the measurements output from sensor systems 60, 64, 68, 72.

Figure 3:
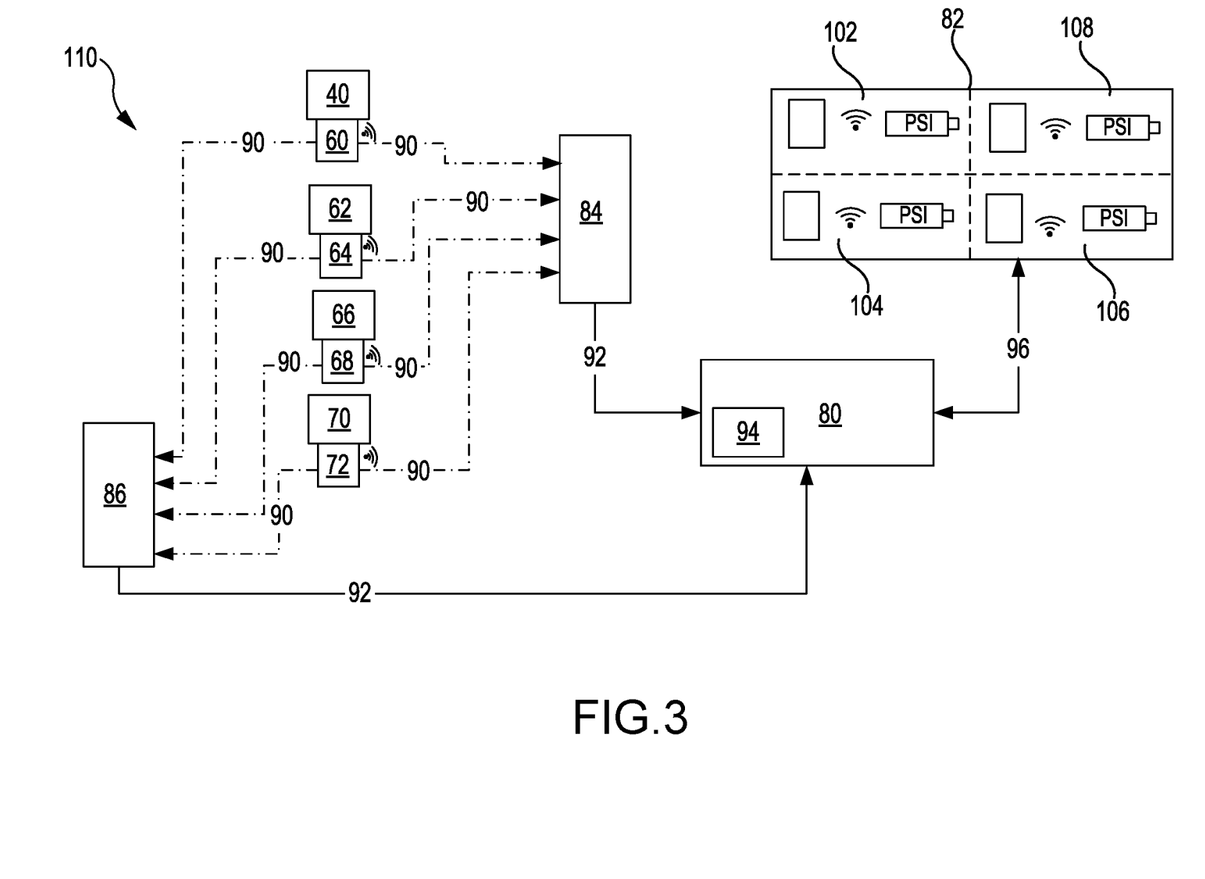
FIG. 3 illustrates a schematic of a system for monitoring the health of the compressed fluid sources of an evacuation assembly, in accordance with various embodiments.

With reference to FIG. 3, a schematic of a system 110 for monitoring the compressed fluid sources of an evacuation assembly is illustrated. In accordance with various embodiments, system 110 may monitor the compressed fluid sources 40, 62, 66, 70 of evacuation assembly 100 (FIG. 1). While system 110 is illustrated as monitoring an evacuation assembly 100 having four (4) compressed fluid sources, it is contemplated and understood that system 110 may be configured to monitor any number of compressed fluid sources.

System 110 includes controller 80. In various embodiments, controller 80 may include or communicate with one or more processors and one or more tangible, non-transitory memories 94 and may be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof. Controller 80 may be configured to make determinations regarding the health of each of compressed fluid sources 40, 62, 66, 70.

Controller 80 is in electronic communication with sensor systems 60, 64, 68, 72. In accordance with various embodiments, controller 80 is configured to receive a series of measurements 90 (e.g., pressure measurements and temperature measurements) wirelessly output by sensor systems 60, 64, 68, 72. In various embodiments, measurements 90 are sent to controller 80 via signals 92 from wireless routers 84, 86. For example, sensor systems 60, 64, 68, 72 are each wirelessly connected to wireless routers 84, 86 of system 110. Measurements 90 are sent to wireless routers 84, 86 via wireless signals output from sensor systems 60, 64, 68, 72. Stated differently, wireless signals corresponding to measurements 90 (i.e., to the measured pressure and temperature of compressed fluid sources 40, 62, 66, 70) are received by wireless routers 84, 86. Controller 80 is in electronic communication (e.g., via wired coupling) with wireless routers 84, 86. Wireless routers 84, 86 may be configured to output signals 92, corresponding to the measurements 90 received from sensor systems 60, 64, 68, 72, to controller 80. Measurements 90 and signals 92 are configured to indicate to controller 80 which sensor system output a particular measurements. In this regard, controller 80 is configured to determine the health of each of the compressed fluid sources 40, 62, 66, 70 based on measurements 90 output by the sensor systems and/or on the signals 92 received from wireless routers 84, 86. Wireless routers 84, 86 may provide a degree of redundancy in that each wireless router may be independently capable of supporting the routing of measurements 90 from the compressed fluid sources 40, 62, 66, 70 to controller 80.

In accordance with various embodiments, controller 80 may be in electronic communication (via wired or wireless connection) with crew notification system 82. Crew notification system 82 may convey information relating to the various conditions of compressed fluid sources 40, 62, 66, 70 to pilots, flight attendants, maintenance personnel, or other operators. Controller 80 may output alert command 96 to crew notification system 82. Alert commands 96 are configured to cause crew notification system 82 to display information and/or alerts relating to various operating conditions of compressed fluid sources 40, 62, 66, 70. The information and/or alerts output by crew notification system 82 are configured to convey to an operator to which compressed fluid source the information and/or alert corresponds. For example, in various embodiments, a portion 102 of crew notification system 82 may convey information related to compressed fluid source 40. A portion 104 of crew notification system 82 may convey information related to compressed fluid source 62. A portion 106 of crew notification system 82 may convey information related to compressed fluid source 66. A portion 108 of crew notification system 82 may convey information related to compressed fluid source 70. Crew notification system 82 may display information related to the pressure of compressed fluid sources 40, 62, 66, 70, the rate at which the pressure of compressed fluid sources 40, 62, 66, 70 is changing, the numbers of days or hours remaining before the pressure of the compressed of fluid source will be below a threshold minimum pressure, or any other information related to compressed fluid sources 40, 62, 66, 70.

Controller 80 may command crew notification system 82 to output an alert, display a maintenance code, or similar message, if controller 80 determines a pressure of one of compressed fluid sources 40, 62, 66, 70 is below a predetermined threshold pressure, if a change in the pressure (i.e., a pressure trend) of one of compressed fluid sources 40, 62, 66, 70 is greater than a predetermined pressure trend threshold, if a difference between the pressure trend of a first compressed fluid source and the pressure trend of a second compressed fluid source is greater than a threshold difference, if a difference between the pressure trend of a first compressed fluid source and the pressure trend average of the other evacuation assembly compressed fluid sources is greater than a threshold difference, and/or if a difference between pressure trend and a moving pressure trend average is outside a threshold difference. In various embodiments, controller 80 may command crew notification system 82 to output an alert, if controller 80 determines measurements 90 are not being received from a particular sensor system. The alert may be configured to convey from which sensor system the measurements 90 are not being received. An alert indicating measurements 90 are not being received tends to indicate to an operator (e.g., pilot, flight attendant, maintenance personnel) that the sensor system, rather than the compressed fluid source, may be in need of maintenance.

Figure 4A:
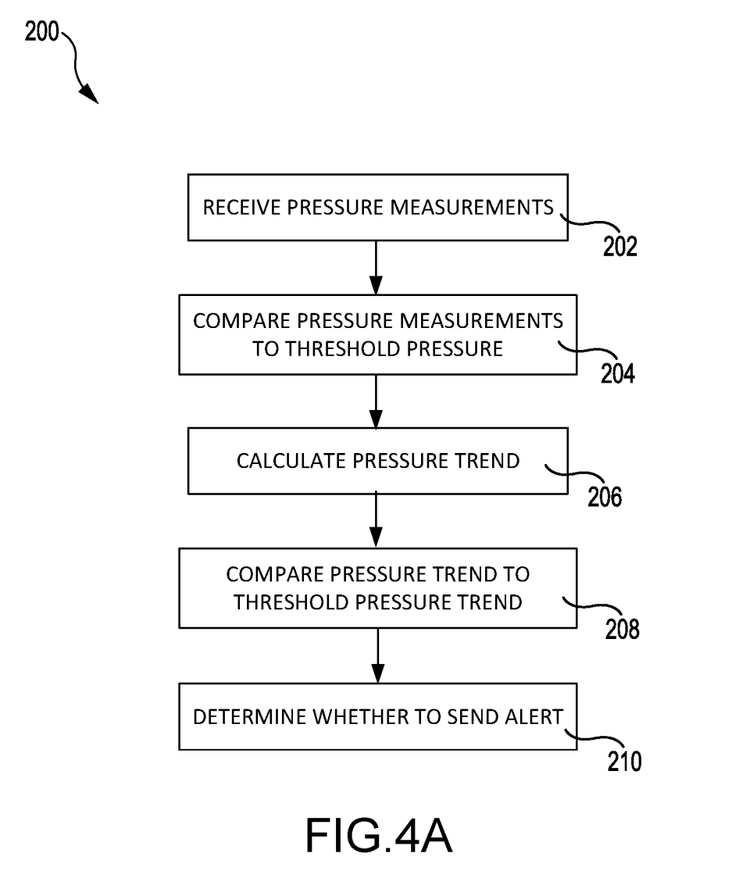
FIGS. 4A and 4B illustrates a method for monitoring the health of the compressed fluid sources of an evacuation assembly, in accordance with various embodiments.

With reference to FIG. 4A, a method 200 for monitoring compressed fluid sources of an evacuation assembly, is shown, in accordance with various embodiments. With combined reference to FIG. 4A and FIG. 3, controller 80 may be capable of carrying out the steps of method 200. Method 200 may be completed prior each flight or each maintenance event for aircraft 10. Method 200 may be completed at desired intervals throughout a flight and/or throughout a day. Method 200 may be completed at a designated time each day, on a designated day and time each week, or at any other desired time interval.

Method 200 may be performed by controller 80 and may include the steps of receiving pressure measurements from sensors (step 202), compare pressure measurements to a threshold pressure (step 204), determining a pressure trend for each compressed fluid source (step 206), comparing each pressure trend to a threshold pressure trend (step 208), and determining whether to send an alert (step 210).

Step 202 may comprise receiving pressure measurements output from one or more sensor systems, such as sensor systems 60, 64, 68, 72, operationally coupled to one or more compressed fluid source, such as compressed fluid sources 40, 62, 66, 70. Step 204 may comprise comparing the pressure measurement from each compressed fluid source to a predetermined threshold pressure.

Step 206 may comprise determining a change in pressure (i.e., a pressure trend) for each compressed fluid source. Step 206 may comprise filtering or conditioning the measurements from sensor systems 60, 64, 68, 72. Conditioning of the measurements may be realized by summation, integration, and/or other filtering techniques. Step 206 may comprise calculating the pressure trend using a series of pressure measurements from a particular sensor system (e.g., the measurements from one of sensor system 60, sensor system 64, sensor system 68, or sensor system 72) taken over a selected time interval. For example, step 206 may comprise, calculating the pressure trend using the current pressure measurement and one or more previous pressure measurements from the same sensor system over the selected time interval.

Step 208 of method 200 may comprise comparing the pressure trend of each compressed fluid source to a predetermined threshold pressure trend. Step 210 may include determining whether to send an alert command based on the comparisons in step 204 and step 208. In this regard, controller 80 may determine to send an alert command 96, if the pressure of any of the compressed fluid sources is less than a threshold pressure and/or if the pressure trend of any of the compressed fluid sources is greater than a threshold pressure trend (i.e., if the rate at which the pressure of the compressed fluid source is changing is greater than a threshold rate).

In various embodiments, step 208 may include comparing the pressure trend of each compressed fluid source to more than one threshold pressure trend value. For example, in various embodiments, step 208 may include comparing the pressure trend of each compressed fluid source to a first threshold trend and to a second threshold trend. The first threshold trend may be selected based on a first number of days (e.g., 30 days, 45 days, 60 day, etc.) until the pressure of the compressed fluid source is less than a minimum pressure, and the second threshold trend may be selected based on a second number of days or hours (e.g., 5 days, 1 day, 12 hours, etc.) until the pressure of the compressed fluid source is less than a minimum pressure. In various embodiments, controller 80 may estimate a time (e.g., 45 days, 30 days, 12 hours, etc.) it will take a pressure of a compressed fluid source to decrease below a threshold pressure based on the current pressure measurement from the compressed fluid source and the pressure trend calculated for that compressed fluid source. Controller 80 may determine whether to send an alert command 96 and/or which alert command to send based on the estimated time.

In accordance with various embodiments, controller 80 may be configured to command crew notification system 82 to display a first alert configured to indicate maintenance should be scheduled, if controller 80 determines the pressure trend is greater than or equal to the first threshold trend and less than or equal to a second threshold trend. For example, the first alert may indicate that the pressure of the compressed fluid source is currently greater than a minimum desired pressure, but based on the pressure trend and the current pressure will be below in the minimum desired pressure in, for example, 30 days. Controller 80 may be configured to command crew notification system 82 to display a second alert configured to indicate more immediate maintenance is needed, if controller 80 determines the pressure trend is greater than the second threshold trend. For example, the second alert may indicate that the pressure of the compressed fluid source is currently greater than a minimum desired pressure, but based on the pressure trend and the current pressure will be below in the minimum desired pressure in, for example, 5 days or 1 day. In various embodiments, the alert command 96 sent by controller 80 may cause crew notification system 82 to display the tine (e.g., days, hours, etc.) until the pressure of the compressed fluid source will be less the minimum threshold pressure. The alerts allow the aircraft operator to make more informed maintenance decisions. Allowing the operator to plan ahead and schedule a time for maintenance of the compressed fluid source, based on how immediate the need for maintenance is, tends to decrease interruptions in flight schedules.

Figure 4B:
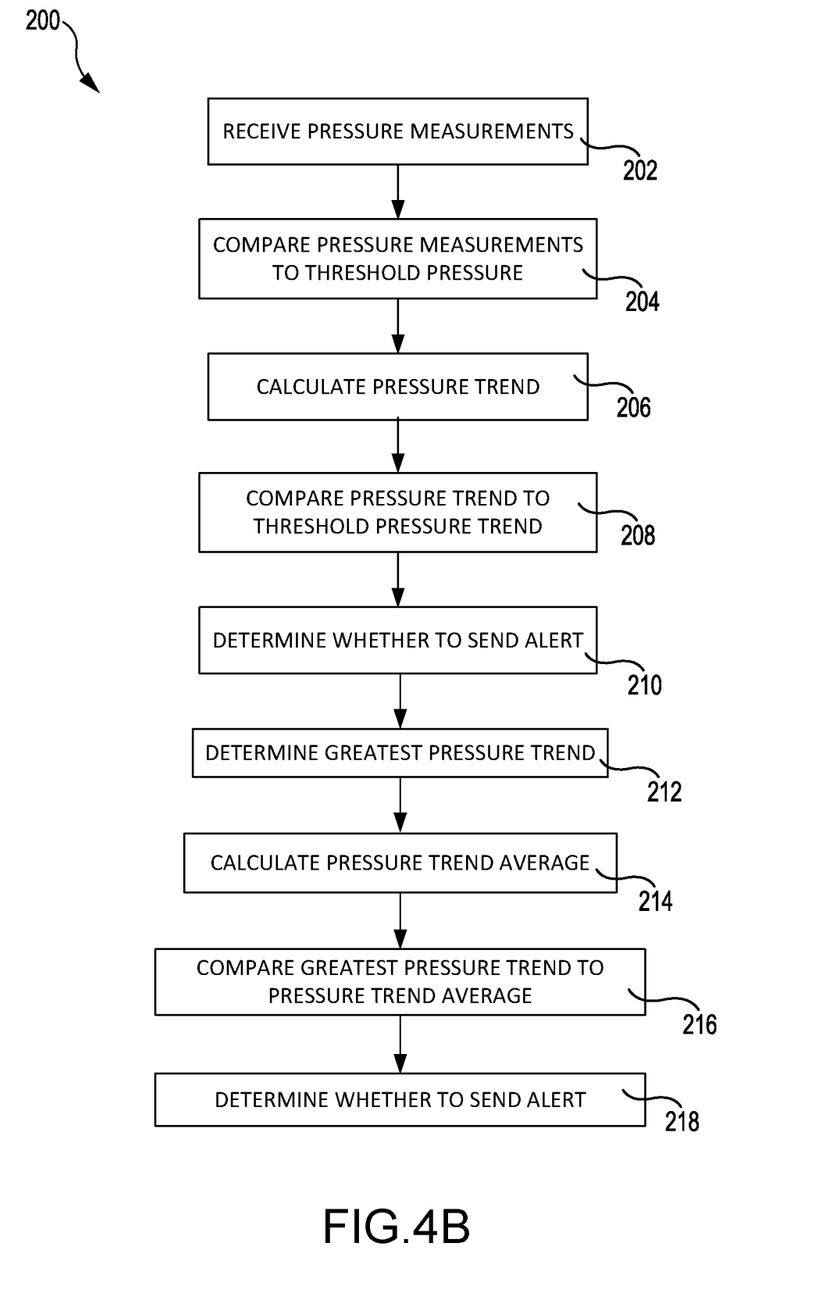

With reference to FIG. 4B, and continuing reference to FIG. 3, in various embodiments, method 200 may further comprise determining a greatest pressure trend value (step 212), deriving a pressure trend average (step 214), comparing the greatest pressure trend value to the pressure trend average (step 216), and determining whether to send an alert (step 218). In various embodiments, controller 80 may perform steps 212, 214, 216, and 218, in response to controller 80 determining that pressure of each of compressed fluid sources 40, 62, 66, 70 was greater than the threshold pressure and that the pressure trend of each of compressed fluid sources 40, 62, 66, 70 was below (i.e., did not exceed) the threshold pressure trend. In this regard, steps 212, 214, 216, 216, 218 may include a second level of health monitoring based on a comparison of the pressure trends of the compressed fluid sources to one another.

In accordance with various embodiments, step 212 may include determining which of the pressure trend values of compressed fluid sources 40, 62, 66, 70 is the greatest. Step 212 may include comparing the pressure trend values of each compressed fluid source to one another. Step 214 may comprise deriving a pressure trend average using any of the non-greatest pressure trend values. Step 214 may comprise selecting a subset of the pressure trend values from step 206 and averaging the subset of the pressure trend values. In various embodiments, the subset of pressure trend values excludes the greatest pressure trend value identified in step 212. From the remaining pressure trend values, excluding the greatest pressure trend value, the remaining pressure trend values may be averaged to calculate the pressure trend average.

Step 216 of method 200 may comprise comparing the greatest pressure trend value (from step 212) and the pressure trend average (from step 214) to find a difference between the greatest pressure trend value and the pressure trend average. The difference may be expressed in terms of magnitude of the difference between the greatest pressure trend value and the pressure trend average, a percentage of the difference between the greatest pressure trend value and the pressure trend average, or other quantification or comparison of the greatest pressure trend value and the pressure trend average. The comparison or difference between the greatest pressure trend value and the pressure trend average may be compared against a threshold difference.

Step 218 of method 200 may comprise determining whether to send an alert command by evaluating if the result of the comparison between the greatest pressure trend value and the pressure trend average is outside the threshold difference. If the result is outside the threshold difference, then it can be concluded that an alert command should be sent. If the result is inside the threshold difference, then it can be concluded that an alert command should not be sent. The alert command may be sent to crew notification system 82. The alert command may cause crew notification system 82 to display a message configured to alert flight or maintenance crew that a compressed fluid source is in need of maintenance and/or replacement. Comparing the pressure trends of compressed fluid sources 40, 62, 66, 70 to one another may provide a more accurate indication of the health of the compressed fluid sources 40, 62, 66, 70 and/or may allow an anomaly to be detected earlier as compared to systems that monitor only the pressure of the compressed fluid sources and/or monitor the compressed fluid sources on an individual, rather than comparative, basis.

In various embodiments, step 214 may include deriving a moving pressure trend average. In this regard, step 214 may further include selecting a set of average pressure trends stored from past measurements, and using the past pressure trend averages and the present pressure trend average to calculate a new average, i.e., a moving average of the pressure trend. In various embodiments, stored averages from, for example, the five (5) to one hundred (100) of the most recent past pressure trends measurements may be averaged with the present pressure trend average to calculate the moving pressure trend average. Stored pressure trend averages from past calculations may be selected based on the age of the stored average. With each new measurement, a new moving pressure trend average may be derived using the subset of stored pressure trend averages, wherein the oldest stored pressure trend average in the subset is omitted and the new pressure trend average from the present measurement is included in each new moving pressure trend average, such that the moving pressure trend average may be updated with each new pressure measurement and each new pressure trend calculation.

In various embodiments, step 216 of method 200 may comprise comparing the greatest pressure trend value (from step 212) and the moving pressure trend average (from step 214) to find a difference between the greatest pressure trend value and the moving pressure trend average. The difference may be expressed in terms of magnitude of the difference between the greatest pressure trend value and the moving pressure trend average, a percentage of the difference between the greatest pressure trend value and the moving pressure trend average, or other quantification or comparison of the greatest pressure trend value, the moving pressure trend average, past pressure trend averages, and/or the present pressure trend averages. The comparison or difference between the greatest pressure trend value and the moving pressure trend average may be compared against a threshold difference.

In various embodiments, step 218 of method 200 may comprise determining whether to send an alert command by evaluating if the result of the comparison between the greatest pressure trend value and the moving pressure trend average is outside the threshold difference. If the result is outside the threshold difference, then it can be concluded that an alert command should be sent. If the result is inside the threshold, then it can be concluded that an alert command should not be sent. The alert command may be sent to crew notification system 82. The alert command may cause crew notification system 82 to display a message configured to alert flight or maintenance crew that a compressed fluid source is in need of maintenance and/or replacement. Comparing the pressure trends of compressed fluid sources 40, 62, 66, 70 to the moving average derived from previous pressure trends of compressed fluid sources 40, 62, 66, 70 may provide a more accurate indication of the health of the compressed fluid sources 40, 62, 66, 70 and/or may allow an anomaly to be detected earlier as compared to systems that only compare the pressure trends to a pressure trend threshold.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for monitoring compressed fluid sources of an evacuation assembly, comprising:
   a controller; and
   a tangible, non-transitory memory configured to communicate with the controller, the tangible, non-transitory memory having instructions stored thereon that, in response to execution by the controller, cause the controller to perform operations comprising:
      receiving, by the controller, a series of first pressure measurements from a first sensor system, the first sensor system being configured to measure a pressure within a first compressed fluid source of the evacuation assembly;

receiving, by the controller, a series of second pressure measurements from a second sensor system, the second sensor system being configured to measure a pressure within a second compressed fluid source;

calculating, by the controller, a first pressure trend for the first compressed fluid source using the series of first pressure measurements;

calculating, by the controller, a second pressure trend for the second compressed fluid source using the series of second pressure measurements;

comparing, by the controller, each of the first pressure trend and the second pressure trend to a threshold pressure trend;

determining, by the controller, whether to send a first alert command based on the comparing, by the controller, each of the first pressure trend and the second pressure trend to the threshold pressure trend; and sending, by the controller, the first alert command to a crew notification system.

2. The system of claim 1, wherein the operations further comprise:

identifying, by the controller, a greatest pressure trend value;

determining, by the controller, a pressure trend average;

comparing, by the controller, the greatest pressure trend value to the pressure trend average; and determining, by the controller, whether to send a second alert command based on a difference between the greatest pressure trend value and the pressure trend average.

3. The system of claim 2, wherein the determining, by the controller, the pressure trend average comprises deriving, by the controller, a moving pressure trend average.

4. The system of claim 1, wherein the comparing, by the controller, each of the first pressure trend and the second pressure trend to the threshold pressure trend comprises:

comparing, by the controller, each of the first pressure trend and the second pressure trend to a first threshold trend; and comparing, by the controller, each of the first pressure trend and the second pressure trend to a second threshold trend, the second threshold trend being different from the first threshold trend.

5. The system of claim 4, wherein the operations further comprise:

determining, by the controller, whether to send at least one of a third alert command or a fourth alert command, wherein the controller is configured to send the third alert command if at least one of the first pressure trend or the second pressure trend is greater than or equal to the first threshold trend and less than or equal to the second threshold trend, and wherein the controller is configured to send the fourth alert command if at least one of the first pressure trend or the second pressure trend is greater than the second threshold trend.

6. The system of claim 1, further comprising a wireless router configured to receive the series of first pressure measurements and the series of second pressure measurements, wherein the wireless router is electrically coupled to the controller, and wherein the series of first pressure measurements and the series of second pressure measurements are sent to the controller via the wireless router.

7. A method for monitoring compressed fluid sources of an evacuation assembly, comprising:

receiving, by a controller, a series of first pressure measurements from a first sensor system, the first sensor system being configured to measure a pressure within a first compressed fluid source of the evacuation assembly;

calculating, by the controller, a first pressure trend for the first compressed fluid source using the series of first pressure measurements;

comparing, by the controller, the first pressure trend to a threshold pressure trend;

receiving, by the controller, a series of second pressure measurements from a second sensor system, the second sensor system being configured to measure a pressure within a second compressed fluid source;

calculating, by the controller, a second pressure trend for the second compressed fluid source using the series of second pressure measurements;

comparing, by the controller, the second pressure trend to the threshold pressure trend; and sending, by the controller, a first alert command to a crew notification system, based on the comparison of the second pressure trend to the threshold pressure trend.

8. The method of claim 7, further comprising:

identifying, by the controller, a greatest pressure trend value;

determining, by the controller, a pressure trend average;

comparing, by the controller, the greatest pressure trend value to the pressure trend average; and determining, by the controller, whether to send a second alert command based on a difference between the greatest pressure trend value and the pressure trend average.

9. The method of claim 8, wherein the determining, by the controller, the pressure trend average comprises:

deriving, by the controller, a moving pressure trend average.

10. The method of claim 7, wherein the comparing, by the controller, the first pressure trend to the threshold pressure trend comprises:

comparing, by the controller, the first pressure trend to a first threshold trend; and comparing, by the controller, the first pressure trend to a second threshold trend, the second threshold trend being different from the first threshold trend.

11. The method of claim 10, further comprising:

determining, by the controller, whether to send at least one of a third alert command or a fourth alert command, wherein the controller is configured to send the third alert command if the first pressure trend is greater than or equal to the first threshold trend and less than or equal to the second threshold trend, and wherein the controller is configured to send the fourth alert command if the first pressure trend is greater than the second threshold trend.

12. An evacuation assembly, comprising:

a first compressed fluid source;

a second compressed fluid source;

a first sensor system configured to measure a pressure within the first compressed fluid source of the evacuation assembly;

a second sensor system configured to measure a pressure within the second compressed fluid source;

a crew notification system in communication with a controller;

the controller operably coupled to the first sensor system and the second sensor system; and a tangible, non-transitory memory configured to communicate with the controller, the tangible, non-transitory memory having instructions stored thereon that, in response to execution by the controller, cause the controller to perform operations comprising:
receiving, by the controller, a series of first pressure measurements output by the first sensor system;
receiving, by the controller, a series of second pressure measurements output by the second sensor system;
calculating, by the controller, a first pressure trend using the series of first pressure measurements;
calculating, by the controller, a second pressure trend using the series of first pressure measurements;
comparing, by the controller, each of the first pressure trend and the second pressure trend to a threshold pressure trend;
identifying, by the controller, a greatest pressure trend value;
determining, by the controller, a pressure trend average;
comparing, by the controller, the greatest pressure trend value to the pressure trend average;
determining, by the controller, whether to send an alert command based on a difference between the greatest pressure trend value and the pressure trend average; and
sending, by the controller, the alert command to the crew notification system.

13. The evacuation assembly of claim 12, wherein the first sensor system is configured to send the series of first pressure measurements wirelessly, and wherein the second sensor system is configured to send the series of second pressure measurements wirelessly.

14. The evacuation assembly of claim 13, further comprising a wireless router configured to receive the series of first pressure measurements from the first sensor system and the series of second pressure measurements from the second sensor system, wherein the wireless router is electrically coupled to the controller, and wherein the series of first pressure measurements and the series of second pressure measurements are sent to the controller via the wireless router.

* * * * *